United States Patent [19]

Pawlak

[11] 4,130,622
[45] Dec. 19, 1978

[54] METHOD OF MAKING SELF-SUPPORTING TUBULAR FILTER

[75] Inventor: Kenneth E. Pawlak, Mundelein, Ill.

[73] Assignee: Abbott Laboratories, North Chicago, Ill.

[21] Appl. No.: 854,161

[22] Filed: Nov. 23, 1977

Related U.S. Application Data

[62] Division of Ser. No. 770,890, Feb. 22, 1977, abandoned.

[51] Int. Cl.² .............................................. B29F 1/00
[52] U.S. Cl. .................................... 264/255; 210/484; 210/497 R; 264/250; 264/257; 264/266; 264/DIG. 48
[58] Field of Search ............... 264/247, 255, 257, 266, 264/DIG. 48, 250; 210/483–485, 497 R

[56] References Cited

U.S. PATENT DOCUMENTS

| | | | |
|---|---|---|---|
| 3,746,595 | 7/1973 | Leason | 156/306 |
| 3,890,679 | 6/1975 | Simon | 264/257 |
| 4,014,796 | 3/1977 | Sugiyama et al. | 210/497 R |

FOREIGN PATENT DOCUMENTS 49-21421  5/1974  Japan ...................................... 264/255

Primary Examiner—James H. Derrington
Attorney, Agent, or Firm—Aaron L. Hardt; Robert L. Niblack

[57] ABSTRACT

A self-supporting tubular filter including a sleeve of filter material and a frame formed by longitudinal and circumferential ribs attached to the sleeve. The filter is characterized by a longitudinal separation along a substantial length of the sleeve which is spliced together by one of the longitudinal ribs. That rib extends through the separation so that it overlies and is attached to the interior and exterior surfaces of the sleeve adjacent to the separation. Also disclosed are the use of the filter as a microemboli blood filter and a method of its manufacture employing a single male core pin with first and second female molds.

5 Claims, 8 Drawing Figures

METHOD OF MAKING SELF-SUPPORTING TUBULAR FILTER

This is a division, of application Ser. No. 770,890, filed Feb. 22, 1977, now abandoned.

BACKGROUND OF THE INVENTION

The present invention relates to self-supporting tubular filters and, particularly, filters useful for the filtration of blood. More particularly, this invention relates to the manufacture of such a filter having improved tear resistance when in use.

Self-supporting filter elements are known in the prior art. For example, U.S. Pat. No. 3,408,438 granted Oct. 29, 1968 to R. Staunton relates to a method of making self-supporting filter elements from fibrous materials. While the filters of Staunton can be formed into a belt or loop, they are essentially flat materials joined by a suitable fastener after a flexible support has been incorporated thereon. French Pat. No. 1,084,239 published Jan. 18, 1955 by M. Rene Jaume disclosed a method for making self-supporting tubular filters and U.S. Pat. No. 3,746,595 granted July 17, 1973 to H. Leason discloses an improvement to the filter of Jaume.

Many materials having a porosity suitable for use as a filter cannot be extruded or otherwise molded as an integral tube. Thus, as illustrated by the patents of Staunton, Jaume and Leason, such materials are formed into tubes by joining flat sheets of the material end to end upon themselves or by sealing two flat sheets to each other along their respective longitudinal edges. No matter how such a tube is formed, its longitudinal seam constitutes a line of weakness likely to rupture when exposed to substantial pressures. If such a tube is in use in a filter when its seam ruptures, it is likely that the integrity of the filter will be lost and that fluid passing therethrough will pass through the rupture in the tube without being filtered.

While such a loss of integrity is undesirable in any filtration process, its occurrence in a blood filter could be disastrous and, therefore, a highly reliable sealing of the seam is a necessity. Unfortunately, in those instances, such as blood filtration, wherein the pore size of the filter material and the material molded thereon generally prevent the formation of a mechanical lock or seal being formed between the filter material and the ribs molded to it.

Accordingly, a need exists for a tubular filter that, during its intended use, will not rupture along seam therein resulting from its formation.

SUMMARY OF THE INVENTION

The primary object of the present invention, therefore, is to provide an improved self-supporting tubular filter which will be free from the aforementioned and other disadvantages of prior devices of this type. More particularly, it is an object of the present invention to provide a self-supporting tubular filter that has improved resistance to rupture or tear when exposed to the fluid pressures of its intended use. Still another object is to provide such an improved filter that is suitable for use as a microemboli blood filter.

In accordance with these and other objects, there is provided by the present invention a self-supporting tubular filter including a sleeve of filter material and a frame formed by longitudinal and circumferential ribs attached to the sleeve. A seam of the sleeve is caused to separate along a substantial length thereof during manufacture of the filter and the sleeve is spliced together by one of the longitudinal ribs which extends through the separation so that it overlies and is attached to the interior and exterior surfaces of the sleeve adjacent to the separation. Where the sleeve has more than one seam, each seam may be separated during manufacture and each separation spliced together by one of the longitudinal ribs.

Preferably, the self-supporting tubular filter is manufactured by joining the longitudinal edges of one or more flat strips of filter material to form a sleeve. The sleeve is placed over an injection molding core pin having a longitudinal channel which is aligned with a seam of the sleeve. The ensleeved core pin is then placed in a first female mold having a cavity complementary to the ensleeved core pin and including a longitudinal groove situated in alignment with the longitudinal channel of the core pin and longitudinal seam of the sleeve.

A thermoplastic material is then injected into the channel of the core pin until the channel becomes filled and causes the sleeve to separate along a substantial length of its seam. The thermoplastic then enters the longitudinal groove of the first female mold and is allowed to solidify in the channel and groove to form an integral longitudinal rib splicing the sleeve and attached to the internal surface of the sleeve adjacent to the separation. Preferably, the groove in the female mold is substantially V-shaped at its bottom, so that the portion of the integral rib external to the sleeve forms substantially a prism.

The ensleeved core pin is then removed from the first female mold and placed into a second female mold having a cavity complementary to the ensleeved core pin and including a longitudinal groove capable of receiving the external portion of the integral rib splicing the sleeve at its separated seam. Thermoplastic material is then injected into the groove of the second female mold and allowed to solidify while in contact with the exterior portion of the integral rib and the exterior surfaces of the sleeve adjacent to the separation. The ensleeved core pin is then removed from the second female mold and next the sleeve with its attached frame removed from the core pin.

Preferably, each seam of the sleeve will be separated and spliced by a longitudinal rib, if the sleeve has more than one longitudinal seam. Additional longitudinal and circumferential ribs are attached to the filter by the use of additional channels or grooves in the core pin and female molds. Preferably, each end of the sleeve is secured by the circumferential ribs.

BRIEF DESCRIPTION OF THE DRAWING

Other objects and attendant advantages will become obvious to those skilled in the art by reading the following detailed description in connection with the accompanying drawing, wherein like reference characters designate like or corresponding parts throughout the several figures thereof and wherein.

DETAILED DESCRIPTION OF THE INVENTION

Figure 1:
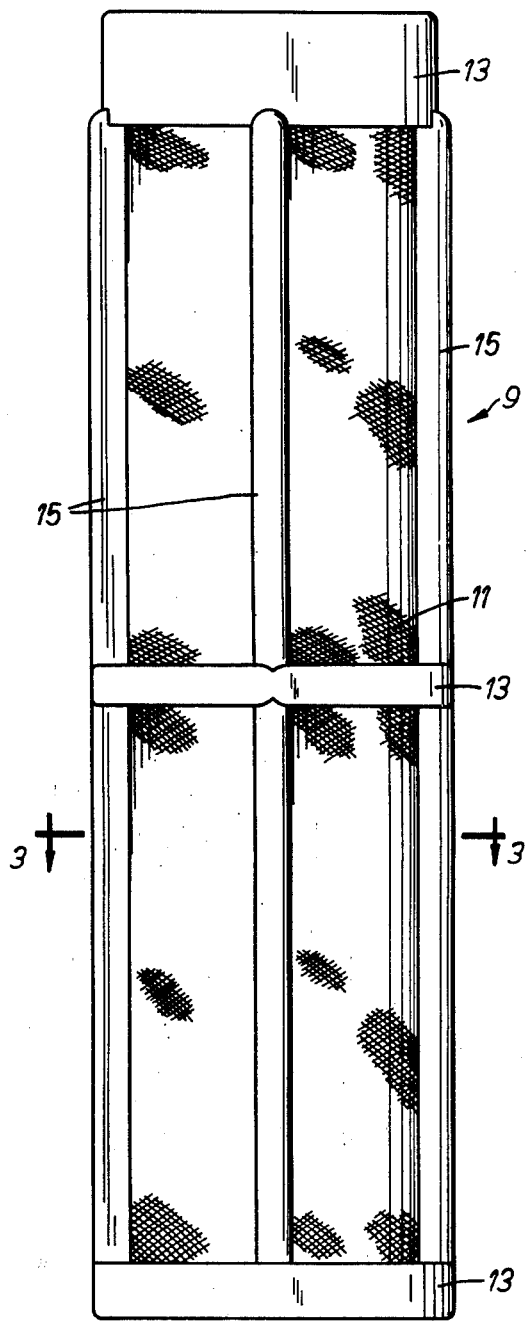
FIG. 1 is a front elevational view of a preferred embodiment of the self-supporting tubular filter of the present invention.

Referring to the drawing, there is shown in FIG. 1 a preferred embodiment of a self-supporting tubular filter 9 manufactured in accordance with the present invention. Filter 9 includes a sleeve 11 of filter material which has a frame of longitudinal ribs 15 and circumferential ribs 13 attached to it.

The filter material of which sleeve 11 is made can be any woven, nonwoven, or foamed material having suitable porosity for the fluid desired to be filtered. For use in microemboli blood filtration the material should have substantially all its pores greater than 5 microns and less than 170 microns in diameter. Preferred filter materials are nylon or polyester.

The frame of filter 9 can be made of any suitable thermoplastic material, whether rigid or flexible. Preferred rigid materials are ABS copolymers (acrylonitrile, butadiene and styrene), cellulose-propionate, polycarbonate, nylon; or acrylic, glass-filled acetal resins, while polypropylene is preferred for flexible frames.

Figure 2:
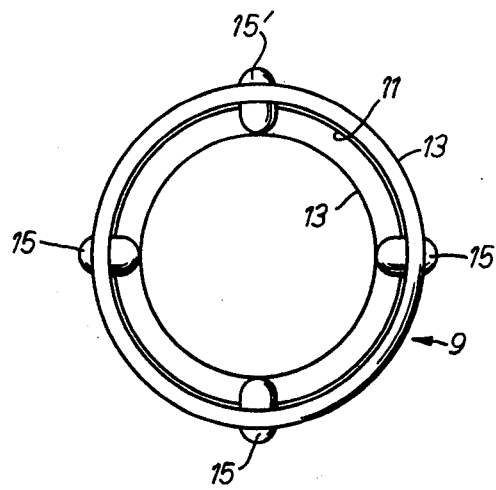
FIG. 2 is a top view thereof.
Figure 3:
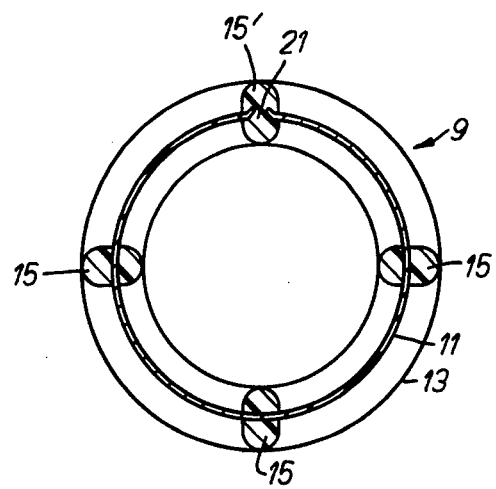
FIG. 3 is a cross-sectional view along the line 3—3 in FIG. 1 of the filter thereof.
Figure 3A:
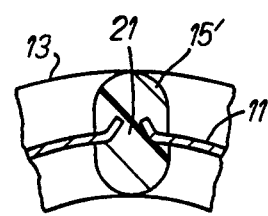
FIG. 3a is an enlarged view of the uppermost portion of FIG. 3.

Viewed from its top, as in FIG. 2, longitudinal ribs 15 of filter 9 can be seen both inside and outside of sleeve 11. As illustrated in FIG. 3, at least one of the longitudinal ribs is an integral rib 15' extending through a separation 21 in sleeve 11 so that it overlies and is attached to the interior and exterior surfaces of sleeve 11 adjacent to the separation 21. Preferably, filter 9 has one such rib 15' for each longitudinal seam present in sleeve 11 as a result of its formation.

The self-supporting tubular filter 9 of this invention is manufactured by a two-step injection molding process. Sleeve 11 is formed of a suitable filter material by joining the longitudinal edges of one or more sheets together into a tube. Preferably, the sheets are joined by heat sealing the edges together of two superimposed sheets to form a cylindrical tube having diametrically opposed seams. The longitudinal seam along which the edges are joined results in a line of weakness in sleeve 11.

Figure 4:
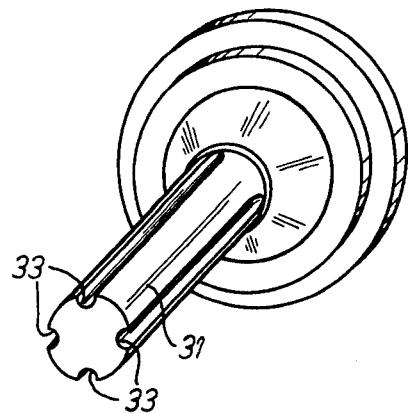
FIG. 4 is a perspective view of an injection molding core pin useful in the manufacture of the filter of FIG. 1.

An injection molding core pin 31, as illustrated in FIG. 4, is then inserted into sleeve 11 in a manner such that a seam of sleeve 11 lies over and in alignment with a longitudinal channel 33 of core pin 31. Preferably, filter 9 will be cylindrical and when it is, core pin 31 will also be cylindrical. The outer dimensions of core pin 31 are slightly less than the inner dimensions of sleeve 11 to allow the core pin to be readily inserted therein and for other molding considerations.

Figure 5:
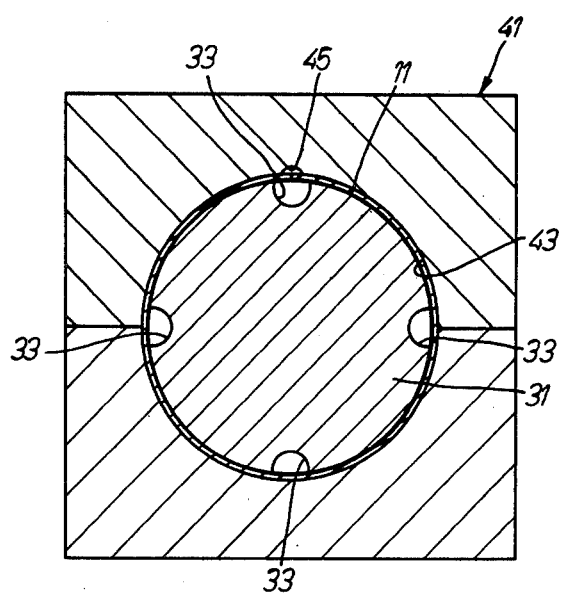
FIG. 5 is a cross-sectional view of the core pin of FIG. 4 ensleeved by a filter material and inserted into a first female mold useful in the manufacture of the filter of FIG. 1.

Core pin 31 ensleeved by sleeve 11 is then inserted into a first female two-part mold shown generally as 41 in FIG. 5. Mold 41 has a cavity 43 complementary to the ensleeved core pin 31 that when closed allows no movement of sleeve 11 on core pin 31. Cavity 43 has a longitudinal groove 45, which groove preferably extends the entire length of sleeve 11 and has a V-shaped cross-section. When the ensleeved core pin 31 is inserted in first female mold 41, the line of weakness of sleeve 11, longitudinal channel 33 and longitudinal groove 45 are in alignment.

Using technology well known in the art of injection molding, a liquid thermoplastic material is then injected into channel 33 of core pin 31 until channel 33 fills and forces sleeve 11 outwardly in the vicinity of its seam. By careful matching of the respective inner and outer dimensions of sleeve 11 and core pin 31, sleeve 11 will separate along a substantial length of its seam and the edges of sleeve 11 at the separation will be forced against the sides of groove 45 as the thermoplastic material enters and fills groove 45. Preferably, sleeve 11 is caused to separate along its entire length. The thermoplastic material is then allowed to solidify so that an integral rib 15' is formed splicing sleeve 11 by its attachment to the internal surfaces of the sleeve adjacent to the separation and extending through the separation a predetermined distance external to the sleeve.

Figure 6:
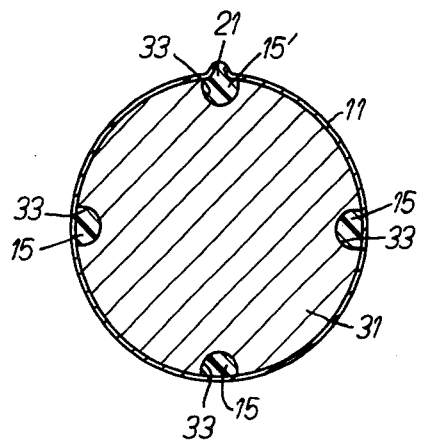
FIG. 6 is a cross-sectional view of the core pin of FIG. 4 after the molding step illustrated in FIG. 5; and, FIG. 7 is a cross-sectional view of the core pin and attachments shown in FIG. 6 inserted into a second female mold useful in the manufacture of the filter of FIG. 1.

Core pin 31 ensleeved by sleeve 11 and the attached rib 15' is then removed from the first female mold 41. When core pin 31 has a plurality of longitudinal channels 33, as shown in FIGS. 4 and 5, sleeve 11 will now have a plurality of longitudinal ribs attached to its interior surface, as illustrated in FIG. 6. Further, if desired, by means of suitably positioned circumferential channels on core pin 31 and/or mold 41, sleeve 11 may now have a plurality of circumferential ribs 13 attached to its ends.

Figure 7:
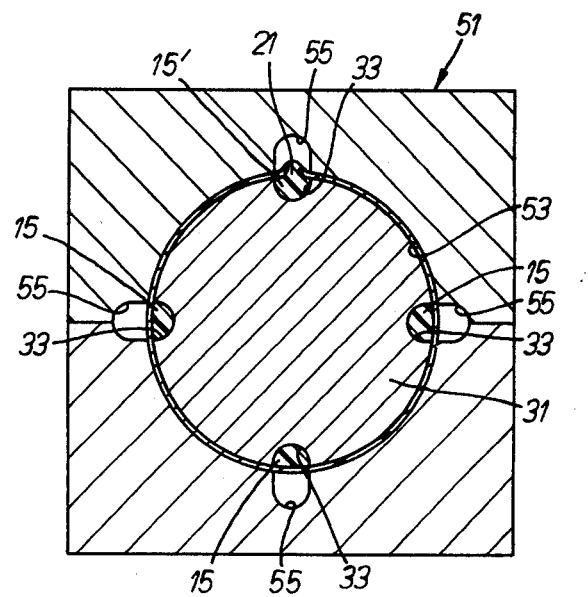

While still inserted in sleeve 11, core pin 31 is then enclosed inside a second female two-part mold 51, as generally shown in FIG. 7. Mold 51 has a cavity 53 complementary to the ensleeved core pin 31 and its attached rib 15' and a longitudinal groove 55 having the capacity to receive the portion of rib 15' external to sleeve 11. In the preferred embodiment, mold 51 has a plurality of grooves 55 and may also have circumferential grooves in cavity 53, if desired.

With the external portion of rib 15' of sleeve 11 and a groove 55 in alignment, by techniques well known in the art of injection molding, a liquid thermoplastic material is injected into the groove 55 until filled and then allowed to solidify so that it overlies and attaches to the external surfaces of sleeve 11 adjacent to separation 21. When the first mold 41 has a groove 45 of the preferred V-shape, the external portion of rib 15' will form an elongated prism that will readily melt when contacted by the liquid thermoplastic injected into the second female mold 51. Thus, when the thermoplastic solidifies, rib 15' will be integral and substantially monostratum. When ensleeved core pin 31 is removed from mold 51 and core pin 31 removed from sleeve 11 and its attached longitudinal and circumferential ribs, the self-supporting tubular filter 9 of this invention will be formed.

While FIG. 1 illustrates the preferred embodiment of filter 9, it will be readily apparent to those skilled in the art that many other configurations of frames may be attached to a sleeve 11 within the spirit and scope of this invention. Further, it will likewise be obvious to those skilled in the art that the filters of this invention can be manufactured by various equivalent methods.

That which I claim is:

1. The process of making a self-supporting tubular filter comprising the steps of:

(a) providing a sleeve of filter material having a longitudinal line of weakness therealong, (b) providing a core pin having outer dimensions slightly less than the inner dimensions of said sleeve and including a longitudinal channel therealong, (c) inserting said core pin into said sleeve with said longitudinal line of weakness aligned above said channel, (d) providing a first female mold having a cavity complementary to said ensleeved pin, said cavity including a longitudinal groove therealong, (e) enclosing said ensleeved pin inside said first female mold with said line of weakness, said channel and said groove in alignment, (f) injecting a thermoplastic material into said channel of said core pin until said channel becomes filled and said injected thermoplastic material forces outwardly against said sleeve at said longitudinal line of weakness separating said sleeve thereat and filling said groove of said female mold, (g) allowing said thermoplastic material to solidify while in contact with said separated sleeve so that said solidified material in said filled channel and groove form an integral rib splicing said sleeve, said rib being attached to the internal surfaces of said sleeve adjacent to said separation and extending through said separation a predetermined distance external to said sleeve, (h) removing said ensleeved core pin from said first female mold, (i) providing a second female mold having a cavity complementary to said ensleeved pin, said second female mold cavity including a longitudinal groove therealong having the capacity to receive said portion of said rib external to said sleeve, (j) enclosing said ensleeved pin inside said second female mold with said portion of said rib external to said sleeve and said groove of said second female mold cavity in alignment, (k) injecting thermoplastic material into said groove of said second female mold cavity until said groove is filled and allowing said injected thermoplastic material to solidify so that it overlies and attaches to the external surfaces of said sleeve adjacent to said separation, (l) removing said ensleeved pin from said second female mold; and (m) removing said sleeve from said core pin; whereby a self-supporting tubular filter having an integral rib splicing a longitudinal separation of said sleeve both internally and externally is formed.

2. The process of making a self-supporting tubular filter as stated in claim 1 wherein said sleeve is cylindrical.

3. The process of making a self-supporting tubular filter as stated in claim 1 and further characterized in that said sleeve has two diametrically opposed said longitudinal lines of weakness therealong, said core pin has two diametrically opposed said longitudinal channels therealong, said first and second female molds each have two diametrically opposed said longitudinal grooves therealong and said tubular filter has two said integral ribs splicing said sleeve both internally and externally.

4. The process of making a self-supporting tubular filter as stated in claim 3 wherein step (a) is achieved by superimposing two strips of said filter material and heat-sealing said strips together along two spaced-apart parallel paths.

5. The process of making a self-supporting tubular filter as stated in claim 1 and further characterized in that said core pin, said first female mold and said second female mold have frame-forming recesses wherein said thermoplastic material can flow during steps (f) and (k) and solidify during steps (g) and (k) to form a frame of longitudinal and circumferential ribs about said sleeves.

* * * * *